US005395677A

United States Patent [19]

Harada et al.

[11] Patent Number: 5,395,677

[45] Date of Patent: Mar. 7, 1995

[54] TRANSPARENT ELECTROPHOTOGRAPHIC FILM

[75] Inventors: Katsumi Harada; Kazuo Asaka, both of Ebina; Takashi Kobayashi; Yoshio Tani, both of Fujinomiya, all of Japan

[73] Assignee: Fuji Xerox Co., Ltd., Tokyo, Japan

[21] Appl. No.: 84,703

[22] Filed: Jun. 25, 1993

[30] Foreign Application Priority Data

Jun. 29, 1992 [JP] Japan .................................. 4-194830
Jun. 29, 1992 [JP] Japan .................................. 4-194831
Jun. 29, 1992 [JP] Japan .................................. 4-194832

[51] Int. Cl.$^6$ .................................................. B32B 3/00

[52] U.S. Cl. .................................... 428/195; 428/323; 428/327; 428/402; 428/480; 428/913

[58] Field of Search ............... 428/480, 483, 913, 323, 428/327, 409, 515, 922, 195, 402; 430/527, 529, 533, 535, 634

[56] References Cited

U.S. PATENT DOCUMENTS

| | | | |
|---|---|---|---|
| 3,874,879 | 4/1975 | Rasch | 96/87 A |
| 4,415,626 | 11/1983 | Hasenaver et al. | 428/323 |
| 4,513,112 | 4/1985 | Ernst et al. | 524/590 |
| 5,236,818 | 4/1993 | Carlson | 430/527 |
| 5,254,448 | 10/1993 | Yamada et al. | 430/523 |

FOREIGN PATENT DOCUMENTS

| | | |
|---|---|---|
| 48-75240 | 10/1973 | Japan . |
| 51-25140 | 3/1976 | Japan . |
| 51-34734 | 9/1976 | Japan . |
| 55-9524 | 1/1980 | Japan . |
| 55-33134 | 3/1980 | Japan . |
| 56-38052 | 4/1981 | Japan . |
| 56-143443 | 11/1981 | Japan . |
| 58-27494 | 6/1983 | Japan . |
| 58-28574 | 6/1983 | Japan . |
| 58-112735 | 7/1983 | Japan . |
| 59-42864 | 10/1984 | Japan . |
| 61-151542 | 7/1986 | Japan . |
| 62-10422 | 3/1987 | Japan . |
| 62-238576 | 10/1987 | Japan . |
| 63-33749 | 2/1988 | Japan . |
| 1-24299 | 5/1989 | Japan . |
| 1-315768 | 12/1989 | Japan . |
| 3-7947 | 1/1991 | Japan . |

*Primary Examiner*—Patrick J. Ryan
*Assistant Examiner*—William A. Krynski
*Attorney, Agent, or Firm*—Oliff & Berridge

[57] ABSTRACT

An electrophotographic film for receiving toner image comprising a transparent substrate having formed on at least one side thereof an image-receiving layer containing a matting agent and a binder, wherein the matting agent comprises at least two kinds of matting agents A and B which are different in shape, matting agent A comprising nearly spherical fine particles, and matting agent B comprising flat fine particles, with the average short diameter and average long diameter of each of matting agents A and B satisfying all of relationships (1), (2) and (3):

$$1 \leq L^1/W^1 \leq 1.5 \quad (1)$$

$$L^2/W^2 > 2 \quad (2)$$

$$W^1/W^2 > 1 \quad (3)$$

wherein $L^1$ and $W^1$ represent the long diameter and the short diameter of matting agent A, respectively; and $L^2$ and $W^2$ represent the long diameter and the short diameter of matting agent B, respectively, matting agent B having a coefficient of static friction of not more than 0.4, and the image-receiving layer has a surface resistivity of from $1 \times 10^9$ to $1 \times 10^{13}$ Ω. The electrophotographic film exhibits excellent feeding properties when fed in an electrophotographic copying machine and satisfactory abrasion resistance.

23 Claims, 3 Drawing Sheets

TRANSPARENT ELECTROPHOTOGRAPHIC FILM

FIELD OF THE INVENTION

This invention relates to a transparent film suitable for electrophotographically forming a transparency by means of an electrophotographic copying machine for paper. More particularly, it relates to an electrophotographic film applicable to an over-head projector (OHP).

BACKGROUND OF THE INVENTION

In applying a transparent plastic film (electrophotographic film) to an electrophotographic copying machine in place of common transfer paper for formation of a transparent image called a transparency, various problems arise: for example, misfeeding of films (e.g., feeding of two or more films from a paper feeder at a time, hereinafter referred to as double feeding), haze, abrasive damage in handling, and insufficient adhesion of toner. In other words, an electrophotographic film for the above use is required to be freed of these disadvantages. For example, misfeeding of films is an intensely practical and pressing problem in copying on transparent films. However, this problem is difficult to solve without sacrificing other characteristics of the film.

In order to improve film feeding properties, various electrophotographic films comprising a transparent substrate having provided thereon an image-receiving layer comprising a matting agent and a polymer have been proposed to date. For example, JP-A-58-112735 (the term "JP-A" as used herein means an "unexamined published Japanese patent application") discloses a film comprising a transparent substrate having formed thereon an image-receiving layer comprising a binder having dispersed therein polymer beads having a particle size of from 0.5 to 40 μm and substantially the same refractive index as the binder. JP-A-48-75240 discloses a film comprising a transparent substrate having formed thereon an image-receiving layer comprising a styrene-(meth)acrylic ester copolymer binder resin having dispersed therein a matting agent. JP-B-1-24299 (the term "JP-B" as used herein means an "examined Japanese patent publication") discloses a film comprising a transparent substrate having provided thereon an image-receiving layer comprising an acrylic resin or a polyester resin as a binder having dispersed therein a matting agent having a particle size of from 0.01 to 10 μm.

In each of the above-cited publications, optimum combination of a matting agent and a binder or the optimum particle size and the optimum amount of a matting agent for improving feeding properties are specified. Although some of these electrophotographic films exhibit improved feeding properties, they undergo a reduction in transparency and abrasion resistance of the surface (i.e., the image-receiving layer) which are demanded for use as OHP sheets. That is, feeding properties are generally improved by increasing the amount of a matting agent or by using a matting agent of relatively large size, but the film transparency will be impaired by light scattering due to the matting agent, or the matting agent tends to fall off the film during handling to cause a reduction in abrasion resistance.

JP-A-1-315768 proposes a film composed of a transparent substrate having formed thereon an image-receiving layer containing a carboxyl-containing acrylate binder, etc. having dispersed therein butyl methacrylate-modified polymethacrylate beads having a volume average diameter of from 8 to 15 μm and polyethylene or tetrafluoroethylene particles having a particle size of from 0.005 to 0.99 μm. The combination of two kinds of matting agents brings about improvements in feeding properties and abrasion resistance to some extent, but the results are still unsatisfactory.

According to JP-A-1-315768 supra, it seems that use of the polyethylene or tetrafluoroethylene beads having a small particle size (0.005 to 0.99 μm) is intended to improve in abrasion resistance and use of the butyl methacrylate-modified polymethacrylate beads is to improve feeding properties. On reviewing this film's properties, the present inventors have discovered that the above-mentioned fine particles of polyethylene, etc. are generally spherical and also have too small a particle diameter so that sufficient abrasion resistance and transparency cannot be obtained. In addition, the butyl methacrylate-modified polymethacrylate beads have too large a particle size and are easily softened so that sufficient feeding properties cannot be assured.

SUMMARY OF THE INVENTION

A first object of the present invention is to provide an electrophotographic film with excellent feeding properties when used in an electrophotographic copying machine.

A second object of the present invention is to provide an electrophotographic film which has excellent feeding properties and is less susceptible to haze development or surface damage due to abrasion.

A third object of the present invention is to provide an electrophotographic film on which a toner is firmly adhered and which has improved resistance to embossing.

A fourth object of the present invention is to provide an electrophotographic film excellent in toner adhesion, resistance to embossing, and abrasion resistance.

A fifth object of the present invention is to provide an electrophotographic film suitable for transparent image formation by means of an electrophotographic copying machine for paper in which a heat roll is used in a toner image fixing part.

A sixth object of the present invention is to provide an electrophotographic film which exhibits excellent transfer properties and excellent feeding properties in a stable manner even with environmental changes, particularly great changes in humidity.

A seventh object of the present invention is to provide an electrophotographic film suitable as an OHP sheet.

The above-mentioned first and second objects of the present invention are accomplished by an electrophotographic film comprising a transparent substrate having formed on at least one side thereof an image-receiving layer containing a matting agent and a binder, wherein the matting agent comprises at least two kinds of fine particles different in shape. One kind of the particles (designated as matting agent A) has a nearly spherical shape. The other (designated as matting agent B) has a flat shape. The average short diameter (or width) and average long diameter (or length) of each of matting agents A and B satisfies all of relationships (1), (2) and (3):

$$1 \leq L^1/W^1 \leq 1.5 \quad (1)$$

$$L^2/W^2>2 \quad (2)$$

$$W^1/W^2>1 \quad (3)$$

wherein $L^1$ represents the long diameter of matting agent A; $W^1$ represents the short diameter of matting agent A; $L^2$ represents the long diameter of matting agent B; and $W^2$ represents the short diameter of matting agent B. matting agent B has a coefficient of static friction of not more than 0.4, and the image-receiving layer has a surface resistivity of from $1\times10^9$ to $1\times10^{13}$ Ω. The above-mentioned electrophotographic film embraces the following preferred embodiments:

1) The electrophotographic film in which matting agent A has an average particle diameter of from 1 to 10 μm.
2) The electrophotographic film in which matting agent B has an average particle diameter of from 1 to 5 μm.
3) The electrophotographic film in which matting agent B has a coefficient of static friction of not more than 0.35.
4) The electrophotographic film in which matting agent A has a ring and ball softening point of higher than 140° C.
5) The electrophotographic film in which matting agent B has a ring and ball softening point of not higher than 140° C.
6) The electrophotographic film in which matting agent A has an average long diameter of from 1 to 15 μm, with its average short diameter ranging from 1 to 10 μm.
7) The electrophotographic film in which matting agent B has an average long diameter of from 1 to 10 μm, with its average short diameter ranging from 1 to 3 μm.

The above-mentioned third, fourth, and fifth objects of the present invention are accomplished by an electrophotographic film comprising a transparent substrate having formed on at least one side thereof an image-receiving layer, wherein the image-receiving layer contains a polyester resin and chain-like colloidal silica, and the image-receiving layer has a surface resistivity of from $1\times10^9$ to $1\times10^{13}$ Ω.

The above-described invention embraces the following preferred embodiments:

1) The electrophotographic film in which the weight ratio of the polyester resin to the chain-like colloidal silica is from 1:4 to 4:1.
2) The electrophotographic film in which the polyester resin has a glass transition temperature (hereinafter abbreviated as Tg) of from 60° to 120° C.
3) The electrophotographic film in which the polyester resin contains a glycidyl group in the molecule thereof.
4) The electrophotographic film in which the chain-like colloidal silica has a thickness (diameter) of from 5 to 20 nm and a length of from 40 to 300 nm.
5) The electrophotographic film in which the image-receiving layer contains a matting agent having an average particle size of from 1 to 5 μm.
6) The electrophotographic film in which the image-receiving layer has a thickness of from 0.1 to 1 μm.
7) The electrophotographic film in which the transparent substrate comprises polyethylene terephthalate.

The above-mentioned sixth and seventh objects of the present invention are accomplished by an electrophotographic film comprising a transparent plastic substrate having formed on at least one side thereof a conductive subbing layer and an image-receiving layer, in this order, wherein the conductive subbing layer comprises fine particles of a conductive metal oxide having an average particle size of not greater than 0.2 μm and a polymer, and the image-receiving layer contains a flat matting agent and a polymer and has a surface resistivity of from $1\times10^{10}$ to $1\times10^{13}$ Ω.

The above-described invention includes the following preferred embodiments:

1) The electrophotographic film in which the polymer of the conductive subbing layer and that of the image-receiving layer are both a water-dispersible polymer.
2) The electrophotographic film in which the conductive subbing layer has a surface resistivity of from $1\times10^{10}$ to $1\times10^{13}$ Ω.
3) The electrophotographic film in which the flat matting agent comprises a polyolefin.
4) The electrophotographic film in which the flat matting agent has a ring and ball softening point of not higher than 140° C.
5) The electrophotographic film in which the flat matting agent has an average particle diameter of from 1 to 10 μm.
6) The electrophotographic film in which the metal oxide is an Sb-doped tin dioxide ($SnO_2$).

DETAILED DESCRIPTION OF THE INVENTION

Figure 1:
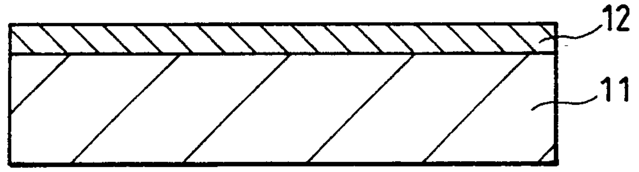
FIGS. 1 and 2 are each a cross section illustrating a basic layer structure of an electrophotographic film according to the present invention.
Figure 2:
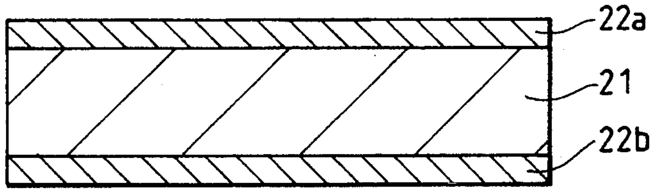

The electrophotographic film of the present invention is composed of a transparent substrate and an image-forming layer provided on one or both sides of the substrate as schematically illustrated in FIGS. 1 and 2.

The film shown in FIG. 1 is composed of transparent substrate 11 having on one side thereof image-receiving layer 12. Transparent substrate 11 is a transparent plastic film with excellent heat resistance, and image-receiving layer 12 comprises a binder having dispersed therein a matting agent and functions to retain a toner image transferred from an electrophotographic copying machine.

The film shown in FIG. 2 has an image-receiving layer 22*a* or 22*b* on each side of transparent substrate 21.

Transparent substrate 11 or 21 is made of any resin materials which are transparent and withstand radiant heat when used as an OHP sheet. Suitable resin materials include polyester resins, e.g., polyethylene phthalate; cellulose esters, e.g., nitrocellulose, cellulose acetate, and cellulose acetate butyrate; polysulfone, polyphenylene oxide, polyimide, polycarbonate, and polyamide. Preferred of them is polyethylene phthalate. While not limiting, the transparent substrate preferably has a thickness of from 50 to 200 μm from the standpoint of ease in handling.

Image-receiving layer 12, 22*a*, or 22*b* is a layer in which a matting agent is dispersed in a binder. The matting agent used in the present invention comprises at least two kinds of matting agents different in shape. One of the matting agents (designated as matting agent A) has a nearly spherical shape. The other (designated as matting agent B) having a flat shape. The average short diameter and average long diameter of each of matting agents A and B satisfies all of relationships (1), (2) and (3):

$$1 \leq L^1/W^1 \leq 1.5 \quad (1)$$

$$L^2/W^2 > 2 \quad (2)$$

$$W^1/W^2 > 1 \quad (3)$$

wherein $L^1$ represents the long diameter of matting agent A; $W^1$ represents the short diameter of matting agent A; $L^2$ represents the long diameter of matting-agent B; and $W^2$ represents the short diameter of matting agent B.

The arrangement of matting agents A and B in the image-receiving layer will be explained below by referring to FIG. 3.

Figure 3:
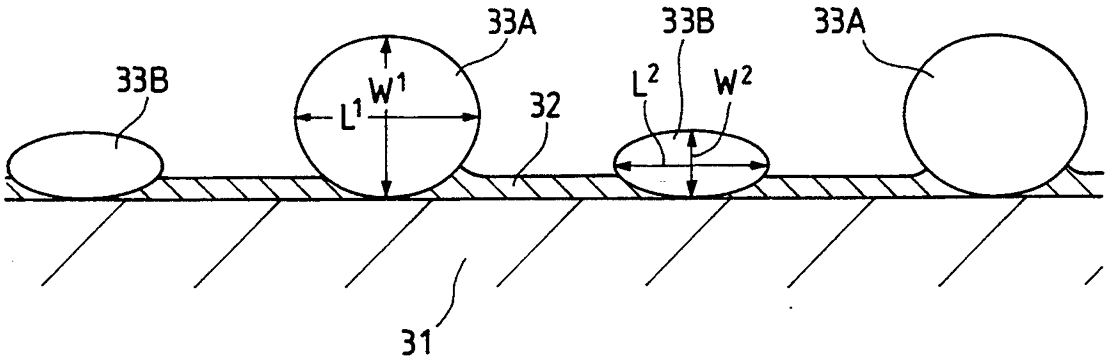
FIG. 3 is a partial enlarged cross section of an electrophotographic film according to the present invention, illustrating the arrangement of matting agent particles.

In FIG. 3, transparent substrate 31 is shown having provided thereon image-receiving layer 32 in which two different kinds of matting agents 33A and 33B are dispersed in a binder. Matting agent 33A has a nearly spherical shape whose short diameter ($W^1$) and long diameter ($L^1$) satisfy relationship (1). Matting agent 33B has a flat shape whose short diameter ($W^2$) and long diameter ($L^2$) satisfy relationship (2). The short diameter of matting agent 33A ($W^1$) and that of matting agent 33B ($W^2$) satisfy relationship (3).

Flat matting agent 33B is exposed in places on the surface of image-receiving layer 32, and spherical matting agent 33A outstandingly protrudes among the flat matting agent particles. Where another electrophotographic film is superposed on such an image-receiving layer, all the particles of matting agent 33A come into direct contact with the other film, while not all of the particles of matting agent 33B have direct contact with the other film, resulting in the formation of air gaps in the non-contact areas. The present inventors have ascertained that the existence of such air gaps improves film feeding properties and reduces double feeding or misfeedings. In addition, being prepared from a material having a coefficient of friction of not more than 0.4, matting agent 33B exhibits excellent surface lubricating properties. Accordingly, due to the air gaps and the excellent lubricating properties, the electrophotographic film according to the present invention is particularly superior in feeding properties.

It is preferable that the above-described matting agent having a nearly spherical shape and having the above-specified dimension, has a high Tg (especially 80° C. or higher) and a high softening point (especially a ring and ball softening point of higher than 140° C.). This does not mean that the spherical matting agent should have a Tg or a softening point.

Suitable materials for use as the nearly spherical matting agent include bead-like plastic powders of polymethyl methacrylate (hereinafter abbreviated as PMMA), crosslinked PMMA, polycarbonate, polyethylene terephthalate or polystyrene; and inorganic fine particles of $SiO_2$, $Al_2O_3$, talc or kaolin. Preferred materials are PMMA and crosslinked PMMA, with crosslinked PMMA being particularly preferred.

The nearly spherical matting agent preferably has an average particle diameter of from 1 to 10 μm, and particularly between 2 μm and 5 μm, an average long diameter of from 1 to 15 μm, and an average short diameter of from 1 to 10 μm. While particles with a large average diameter are preferred, too large particles tend to fall off the image-receiving layer to cause dusting, which easily induces abrasive damage to the surface and also causes an increase of haze. For this reason, the above-specified range of average particle diameter is recommended. The nearly spherical matting agent is preferably present in an amount of from 0.1 to 5% by weight, and more preferably from 0.5 to 3% by weight, based on the weight of the binder.

The above-described flat matting agent having the above-specified dimension comprises a material having a coefficient of static friction of not more than 0.4. The flat matting agent preferably has a relatively low softening point, e.g., a ring and ball softening point of lower than 140° C., and particularly of from 100° to 140° C. With respect to the coefficient of static friction of plastics, reference can be made, e.g., to Motoyoshi Masanobu, *Plastic NO KASSEI TO KATSUZAI*, p. 15, Nikkan Kogyo Shinbunsha and W. A. Zisman, *Advances in Chemistry*, Series No. 43, "Contact Angle Wettability and Adhesion", A. Chem. Soc., Washington (1964). Specifically, a coefficient of static friction is an f/N ratio, usually symbolized by μ, wherein f is a frictional force exerted on the contact area when two solids in contact with each other begin to slide by outer force, and N is a pressure exerting on the contact area (a load in many cases). The coefficient of static friction can be measured with a friction meter, e.g., "HEIDON-14" manufactured by Shinto Kagaku Co., Ltd., under conditions of 25° C. and 65% relative humidity (RH).

Suitable materials for use as the flat matting agent include polyethylene, polyvinyl fluoride, polyvinylidene fluoride, polytrifluoroethylene (Teflon). Specific examples of these materials include low-molecular weight polyolefin type matting agents (e.g., polyethylene-based matting agents) and paraffin type or microcrystalline type wax emulsions. The flat matting agent preferably has an average diameter of from 1 to 5 μm, and more preferably from 2 to 4 μm, an average long diameter of from 1 to 10 μm, and an average short diameter of from 1 to 3 μm. The flat matting agent is preferably present in an amount of from 0.1 to 5% by weight, and more preferably from 0.5 to 3% by weight, based on the weight of the binder.

The method conventionally adopted for improving the slip of an image receiving layer consists of covering the surface of the image-receiving layer with a lubricating material. However, since an improvement in slip has been attended by a reduction of toner adhesion to the image-receiving layer, the method has failed to satisfy both of these conflicting properties. According to the present invention, an improvement in slip can be achieved by arranging spherical particles of larger size in places and flat-shaped lubricating particles among them, thereby satisfying both the lubricating properties of an image-receiving layer and toner adhesion to the image-receiving layer with good consistency.

The above-described flat matting agent may have previously been shaped into flat particles. It is also possible that a matting agent having a relatively low softening point (preferably the above-specified preferred softening point) is used and afterward shaped into flat particles by the heat of coating and drying of an image-receiving layer or by heating while applying pressure thereon. In general, shaping the matting agent into flat particles by the heat of coating and drying requires a higher temperature or a longer treating time than needed in heating under pressure.

The short and long diameters of the spherical or flat matting agent in the image-receiving layer can be determined by measurements on a cut area of the image-receiving layer under an electron microscope and averaging the measured values.

The image-receiving layer contains a binder resin in which the above-described matting agents are dispersed. The binder resin to be used is chosen from those which are satisfactory in terms of toner transfer properties on development, non-offset properties at the fixing part, resistance to embossing, and toner adhesion after copying. Suitable binder resins include polyester resins, polyether resins, acrylic resins, epoxy resins, urethane resins, amino resins, and phenolic resins. These resin materials may be used either individually or in combinations thereof. Preferred binder resins are polyester resins, and particularly those having a Tg ranging from 60° to 120° C.

The image-receiving layer preferably has a thickness of from 0.1 to 1 μm.

Chain-like colloidal silica which can be incorporated into an image-receiving layer will be described below in detail.

Colloidal silica is a dispersion of silicic anhydride fine particles in water or an organic solvent, e.g., an alcohol. Known colloidal silica modifications include water-dispersed colloidal silica (silica sol) in which the surface of fine particles is stabilized with a cation (e.g., Na ion) and organic solvent-dispersed colloidal silica (organosol) in which fine particles with hydroxyl groups on their surface rendered hydrophobic are dispersed in an organic solvent.

Figure 8:
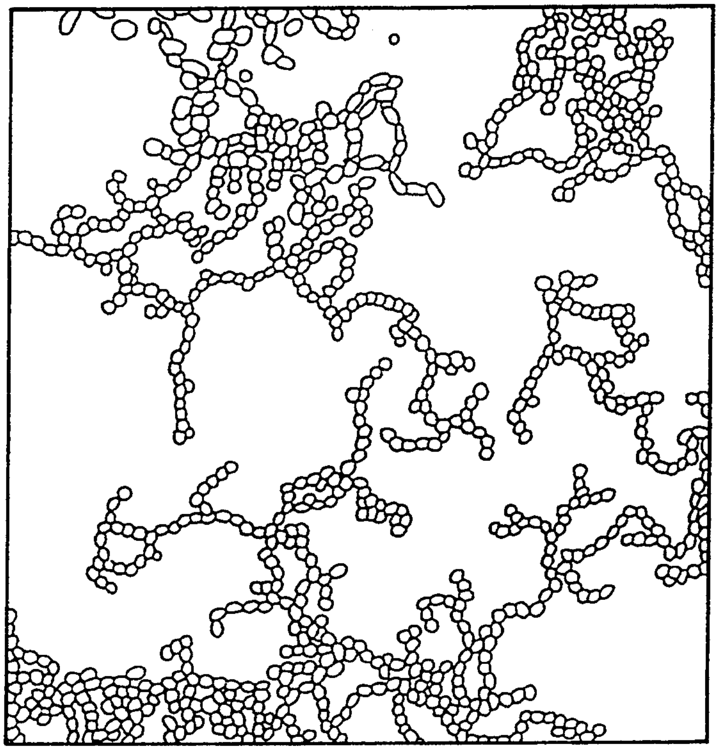
FIG. 8 is a sketch of an electron micrograph of the chain-like colloidal silica used in an electrophotographic film of the present invention.

Unlike the conventional silica sol having a nearly spherical shape, the colloidal silica which can be used in the present invention has a chain shape. That is, the particles are connected to each other in a long winding or cord-like shape with a certain thickness, mostly branching off. Such a shape of the chain-like colloidal silica is illustrated in FIG. 8, a sketch of an electron micrograph of the chain-like colloidal silica (200,000 magnifications). The chain-like colloidal silica preferably has a thickness (diameter) of from 1 to 20 nm, and more preferably from 5 to 20 nm, and a length of from 10 to 500 nm, and more preferably from 40 to 300 nm.

The above-mentioned chain-like colloidal silica exhibits improved film forming properties and binding properties compared to conventional spherical colloidal silica. When, in particular, combined with a certain polyester resin hereinafter described, the chain-like colloidal silica provides an image-receiving layer having not only improved heat resistance but sufficient film strength.

The chain-like colloidal silica is commercially available as an aqueous dispersion sold by Nissan Chemicals Industries, Ltd. under a trade name of "SNOWTEX (ST)-UP or -OUP".

In addition to the chain-like colloidal silica, the image-receiving layer may further contain conventional spherical colloidal silica.

The polyester resin, which can be used as a binder in combination with the chain-like colloidal silica, is preferably water-dispersible so that it can be mixed with the aqueous dispersion of the chain-like colloidal silica to prepare an aqueous coating composition. Polyester resins having a glycidyl group in the molecular structure thereof are preferred. The glycidyl group appears to make a great contribution to the improvement of toner image adhesion. The polyester resin preferably has a molecular weight of from 2,000 to 30,000. If the molecular weight is less than 2,000, the photographic films when piled up tend to undergo blocking and have reduced film strength. If the molecular weight exceeds 30,000, offset of a toner to a fixing roll is apt to occur. Further, the polyester resin preferably has a Tg of from 60° to 120° C. If the Tg is less than 60° C., the image-receiving layer tends to be fused or softened by the heat of a heated fixing roll, and emboss marks (surface unevenness) may remain to impair transparency. If the Tg exceeds 120° C., the toner adhesion tends to be reduced.

The compounding ratio of the amount of chain-like colloidal silica to the polyester resin, and the thickness of the image-receiving layer containing them, are appropriately selected according to an electrophotographic copying machine to be used or the end use of the electrophotographic film. When an image-receiving layer has a high polyester resin content and a large thickness, the film has improved toner adhesion. On the other hand, when an image-receiving layer has a high colloidal silica content, the film has improved resistance to embossing. With these tendencies being taken into consideration, a preferred weight ratio of polyester resin to chain-like colloidal silica ranges from 1:4 to 4:1, and more preferably from 1:2 to 2:1.

It is necessary for the above-described image-receiving layer to have a surface resistivity of from $1\times10^9$ to $1\times10^{13}$ Ω as measured at 25° C. and 65% relative humidity (RH). If the surface resistivity is less than $1\times10^9$ Ω, a sufficient amount of a toner cannot be transferred to the image-receiving layer only to form a toner image of low density. If the surface resistivity exceeds $1\times10^{13}$ Ω, the electrophotographic film is easily electrified during handling, which attracts the dust and is apt to cause misfeeding or double feeding during copying.

Adjustment of surface resistivity to the above specific range can easily be effected by any known methods, for example, by incorporating of an antistatic agent into the image-receiving layer. Examples of suitable antistatic agents which can be used include alkyl phosphates, alkylsulfates, sodium sulfonates, and quaternary ammonium salts.

In some cases, an image-receiving layer may be softened or fused by the heat of a fixing roll to develop surface unevenness, namely, emboss marks. In order to prevent development of emboss marks, silica sol may be added to the image-receiving layer. Silica sol to be added is preferably particles of silicon dioxide having an average particle size of from 10 to 500 nm. The silica sol in an aqueous disperse system is easy to handle. The silica sol is preferably chain-like silica sol.

If desired, the image-receiving layer may further contain known additives, such as colorants, ultraviolet absorbents, crosslinking agents, and antioxidants, as long as the intended characteristics are not impaired.

An image-receiving layer can be formed by coating a transparent substrate with a coating composition prepared by dispersing or dissolving the above-described components, such as matting agents, binders, chain-like colloidal silica, and necessary additives, in water or an organic solvent, followed by heat drying.

Coating can be carried out by means of any known coating apparatus, e.g., an air doctor coater, a blade coater, a rod coater, a knife coater, a squeeze coater, a reverse roll coater, a bar coater, and so on.

Figure 4:
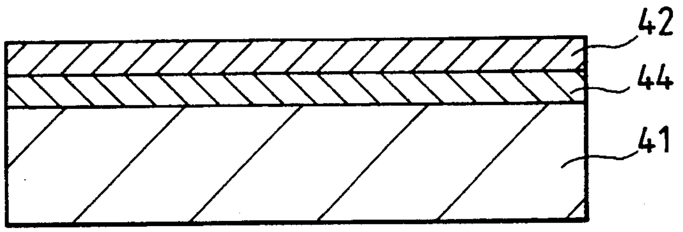
FIGS. 4 and 5 are each a cross section illustrating a layer structure of an electrophotographic film according to the present invention which has a conductive subbing layer.
Figure 5:
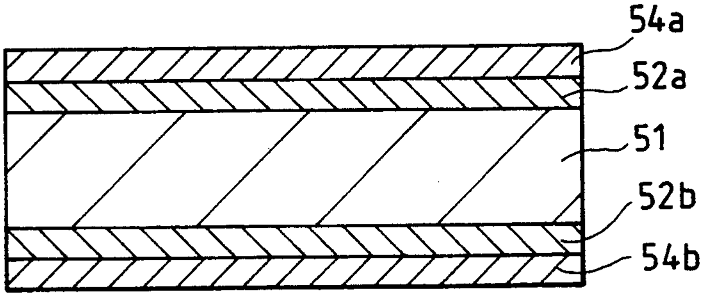

While the electrophotographic film of the present invention has been explained with reference to a layer structure composed of a transparent substrate and an image-receiving layer, it is possible to provide a conductive subbing layer between the transparent substrate and the image-receiving layer as illustrated in FIGS. 4 and 5.

The film shown in FIG. 4 is composed of transparent substrate 41 having provided on one side thereof conductive subbing layer 44 and image-receiving layer 42, in this order. The film shown in FIG. 5 has conductive subbing layer **52*a* or 52*b* and image-receiving layer 54*a* or 54*b* on each side of transparent substrate 51**.

The conductive subbing layer, which can be provided in the present invention, is a layer comprising a binder resin having dispersed therein fine particles of a conductive metal oxide having an average particle diameter of not greater than 0.2 μm. The conductive subbing layer should have a surface resistivity between $1\times10^{10}\,\Omega$ and $1\times10^{13}\,\Omega$ as measured at 25° C. and 65% relative humidity (RH). It is preferable that the surface resistivity of the conductive subbing layer should fall within the above specific range when measured under any of conditions of 10° C./30% RH, 25° C./65% RH, and 30° C./90% RH.

Specific examples of the conductive metal oxide are $ZnO$, $TiO$, $SnO_2$, $Al_2O_3$, $In_2O_3$, $SiO_2$, $MgO$, $BaO$, and $MoO_3$. These compounds may be used either individually or in the form of a compound oxide thereof. Further, these metal oxides preferably contain a different element as a dopant. For example, ZnO doped with Al, In, etc.; TiO doped with Nb, Ta, etc.; and $SnO_2$ doped with Sb, Nb, a halogen element, etc. are preferred. Among them, Sb-doped $SnO_2$ is especially preferred for its stability in conductivity over time.

The metal oxide fine particles to be used in the present invention preferably have a small particle diameter so as to minimize light scattering. For use as an OHP sheet for providing a projected image, the electrophotographic film desirably has a light scattering efficiency of not more than 20%. To this effect, the average particle diameter of the conductive metal oxide should be 0.2 μm or smaller, and preferably 0.1 μm or smaller.

The polymer which can be used in the conductive subbing layer is not particularly limited. For example, suitable water-soluble polymers include polyvinyl alcohol, polyacrylic acid, polyacrylamide, polyhydroxyethyl acrylate, polyvinylpyrrolidone, water-soluble polyester, water-soluble polyurethane, water-soluble nylon, water-soluble epoxy resins, gelatin, hydroxyethyl cellulose, hydroxypropyl cellulose, carboxymethyl cellulose, and derivatives thereof. Useful polymers other than these water-soluble polymers include acrylic resins, polyester, polyvinyl acetate, and SBR (styrene-butadiene rubber). These polymers are preferably used as an aqueous dispersion or emulsion.

In the present invention, it is particularly preferable to use the polymer as an aqueous dispersion. Polymers suitable for use as an aqueous dispersion are water-dispersible polymers, such as acrylic resins and polyester resins. The water-dispersible polymers preferably contain a polar group (e.g., a quaternary ammonium base, a sulfo group, a sulfonate group, a carboxyl group, a carboxylate group, a phospho group, or a phosphate group) per molecule in an amount of from 0.1 to 10% by weight, and particularly from 1 to 5% by weight. In particular, an ammonium carboxylate group is preferred as a polar group, and an acrylic resin is preferred as a polymer for the conductive subbing layer.

The above-mentioned polymers may contain a crosslinking agent, a surface active agent, etc.

A mixing ratio of the metal oxide particles to the water-soluble or water-dispersible polymer preferably ranges from 1:3 to 3:1 by weight. The conductive subbing layer usually has a thickness of from 0.01 to 1.00 μm, and preferably from 0.05 to 0.5 μm, so that the surface resistivity may fall within the range of from $1\times10^{10}$ to $1\times10^{13}\,\Omega$ at 30 to 90% RH.

The conductive subbing layer can be formed in the same manner as the image-receiving layer.

When the image-receiving layer is provided on the conductive subbing layer, the image-receiving layer should also have a surface resistivity between $1\times10^{10}\,\Omega$ and $1\times10^{13}\,\Omega$ as measured at 25° C. and 65% RH. It is preferable that the surface resistivity of the image-receiving layer should fall within the above range when measured under any of the conditions of 10° C./30% RH, 25° C./65% RH, and 30° C./90% RH.

The present invention will now be illustrated in greater detail with reference to Examples, but it should be understood that the present invention should not be construed as being limited thereto. All the parts are by weight and for the solids or nonvolatile contents.

EXAMPLE 1

A 100 μm thick polyethylene terephthalate film having been biaxially stretched and heat-set was subjected to a corona discharge treatment.

A coating composition for an image-receiving layer was prepared from the following components.

| Formulation of Image-Receiving Layer: | |
|---|---|
| Water-dispersible glycidyl acrylate-modified polyester ("A515G" produced by Takamatsu Yushi Co., Ltd.; Tg: 75° C.) | 3.00 parts |
| Crosslinked PMMA matting agent ("MR-2G-20-5" produced by Soken Kagaku Co., Ltd.; average particle diameter: 3 μm) | 0.02 part |
| Low-molecular weight polyolefin matting agent ("Chemipearl W100" produced by Mitsui Petrochemical Industries, Ltd.; average particle diameter: 3 μm; softening point: 128° C.; coefficient of static friction*: 0.33) | 0.05 part |
| Phosphoric ester surface active agent ("Zerex OM" produced by Miyoshi Oil & Fat Co., Ltd.) | 0.30 part |
| Pure water | 100 parts |

*Measured on a film of the polyolefin with HEIDON-14 (manufactured by Shinto Kagaku Co., Ltd.) at 25° C., 65% RH.

The coating composition was coated on the polyethylene terephthalate film by means of a bar coater #4.6 and dried at 185° C. for 10 minutes to form an image-receiving layer having a thickness of 0.15 μm. The same image-receiving layer was also formed on the reverse in the same manner.

A cut section of the resulting electrophotographic film was observed under an electron microscope to determine the dimensions of the crosslinked PMMA matting agent and the low-molecular weight polyolefin matting agent in the image-receiving layer. As a result, the former matting agent had an average short diameter of 3.0 μm and an average long diameter of 3.0 μm, and the latter matting agent had an average short diameter of 1.0 μm and an average long diameter of 3.5 μm.

Comparative Example 1

An electrophotographic film was prepared in the same manner as in Example 1, except for using no low-molecular weight polyolefin matting agent and changing the amount of the crosslinked PMMA matting agent to 0.07 part.

Comparative Example 2

An electrophotographic film was prepared in the same manner as in Example 1, except for using no crosslinked PMMA matting agent and changing the amount of the low-molecular weight polyolefin matting agent to 0.07 part.

EXAMPLE 2

A 100 μm thick polyethylene terephthalate film having been biaxially stretched and heat-set was subjected to a corona discharge treatment.

A coating composition for a conductive subbing layer was prepared from the following components.

| Formulation of Conductive Subbing Layer: | |
|---|---|
| Water-soluble acrylic resin ("Jurymer ET-410" produced by Nippon Junyaku Co., Ltd.) | 1.55 parts |
| Tin dioxide ("SN-88" produced by Ishihara Sangyo Kaisha, Ltd.; average particle diameter: 88 nm) | 1.80 parts |
| Sodium sulfonate surface active agent ("Sandet BL" produced by Sanyo Kasei Co., Ltd.) | 0.125 part |
| Nonionic surface active agent ("EMALEX/NP8.5" produced by Nippon Emulsion Co., Ltd.) | 0.125 part |
| Pure water | 96.4 parts |

The coating composition was coated on the polyethylene terephthalate film by means of a bar coater #2.4 at a coating speed of 105 m/min and dried at 185° C. for 10 minute to form a conductive subbing layer having a thickness of 0.15 μm. The same subbing layer was also formed on the reverse side of the film.

A coating composition for an image-receiving layer was prepared from the following components.

| Formulation of Image-Receiving Layer: | |
|---|---|
| Water-dispersible glycidyl acrylate-modified polyester (A515G) | 2.00 parts |
| Chain-like colloidal silica ("SNOWTEX OUP" produced by Nissan Chemicals industries, Ltd.) | 1.00 part |
| Crosslinked PMMA matting agent (MR-2G-20-5) | 0.025 part |
| Low-molecular weight polyolefin matting agent (Chemipearl W100) | 0.05 part |
| Nonionic surface active agent (EMALEX/NP8.5) | 0.10 part |
| Pure water | 96.825 parts |

The coating composition was coated on the polyethylene terephthalate film by means of a bar coater #4.6 and dried at 140° C. for 1 minute while pressing to form an image-receiving layer having a thickness of 0.15 μm. The same image-receiving layer was also formed on the reverse side of the film in the same manner.

A cut section of the resulting electrophotographic film was observed under an electron microscope to determine the dimensions of the crosslinked PMMA matting agent and the low-molecular weight polyolefin matting agent in the image-receiving layer. As a result, the former matting agent had an average short diameter of 3.0 μm and an average long diameter of 3.0 μm, and the latter matting agent had an average short diameter of 1.0 μm and an average long diameter of 3.5 μm.

Each of the electrophotographic films prepared above was evaluated according to the following test methods. The results obtained are shown in Table 1 below.

1) Haze (%):

Measured with a haze meter ("HGM-2DP" manufactured by Suga Shikenki Co., Ltd.)

Figure 6:
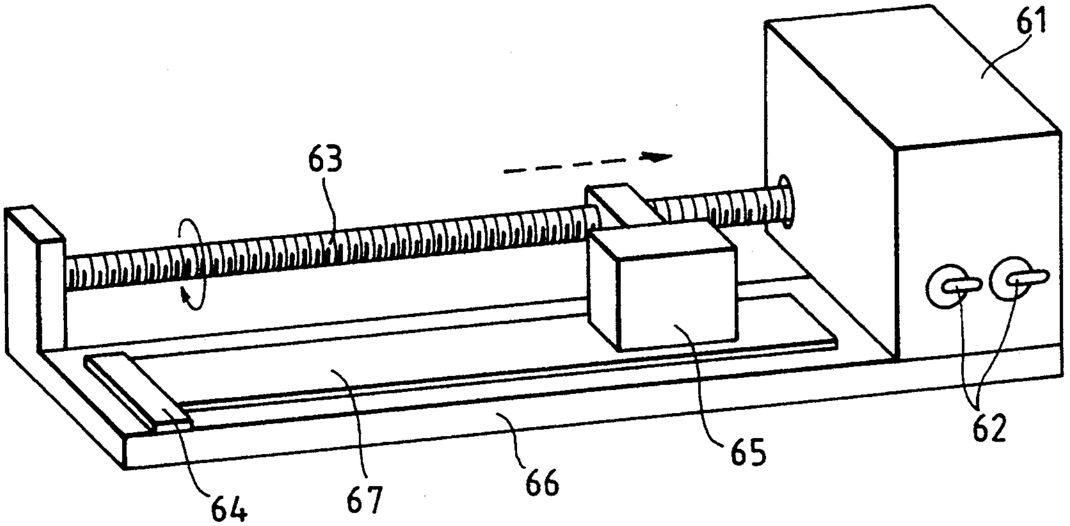
FIG. 6 is a perspective view of an abrasion tester which was used to evaluate the abrasion resistance of an electrophotographic film.

2) Abrasion Resistance:

Abrasion resistance of the film was tested with an abrasion tester shown in FIG. 6 (manufactured by Shinto Kagaku Co., Ltd.).

Figure 7:
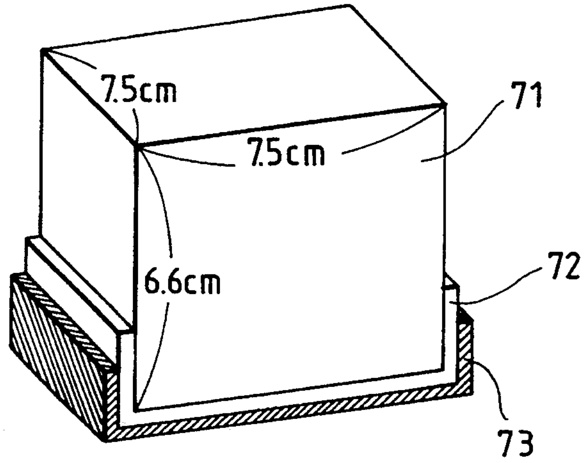
FIG. 7 is a perspective view of a weight which was used to evaluate the abrasion resistance of an electrophotographic film.

The abrasion tester comprises driving part 61, switches 62, screw 63, cramp 64, load 65, and stage 66. As shown in FIG. 7, load 65 comprises weight 71 with its bottom lined with flannel-like cloth 72 so as to give a uniform load and further covered with black paper 73 so as to visualize the wear of the image-receiving layer.

Film sample 67 was placed on stage 66 and fixed with cramp 64, and load 65 weighing 3 kg was traversed on sample 67 at the rate of 2.8 cm/min by means of screw 63 by one stroke. The surface condition of the film was observed and rated as follows.

A . . . Slight scratches were observed.

C . . . Many scratches were observed.

3) Film Feeding Properties (Rate of Double Feeding; %):

Photocopies were taken by an electrophotographic copying machine ("VIVACE-120" manufactured by Fuji Xerox Co., Ltd.). The film feeding properties were evaluated in terms of the frequency of double feeding per 100 copies.

4) Toner Adhesion:

A solid black image of a copy taken by an electrophotographic copying machine ("Model 5017" manufactured by Fuji Xerox Co., Ltd.) was subjected to a Scotch tape adhesion test. The optical density of the toner image before and after peeling of the adhesive tape was measured with an optical densitometer ("X-Rite 310TR" manufactured by X-Rite Co., Ltd.) to obtain a toner adhesion (%) according to formula:

$$\frac{\text{Optical Density After Peeling}}{\text{Optical Density Before Peeling}} \times 100$$

5) Toner Transfer Properties:

Photocopies were taken by an electrophotographic copying machine ("Model 5026" manufactured by Fuji Xerox Co., Ltd.). The optical density of the resulting 10 copies was measured with an optical densitometer, X-Rite 310TR.

6) Surface Resistivity (Ω):

Measured with a resistivity meter "Model TR-8601" manufactured by Advantest Co., Ltd. at 25° C. and 65% RH.

TABLE 1

| | Example 1 | Compar. Example 1 | Compar. Example 2 | Example 2 |
|---|---|---|---|---|
| Haze (%) | 4.8 | 3.0 | 5.0 | 4.7 |
| Abrasion Resistance | A | C | A | A |
| Rate of Double Feeding (%) | 0 | 15 | 34 | 0 |
| Toner Adhesion (%) | 55 | 57 | 52 | 88 |
| Toner Transfer Properties | 0.86 | 0.83 | 0.85 | 0.85 |
| Surface Resistivity (Ω) | $8 \times 10^{10}$ | $8.5 \times 10^{10}$ | $4.8 \times 10^{10}$ | $2 \times 10^{11}$ |

EXAMPLE 3

A 100 μm thick polyethylene terephthalate film having been biaxially stretched and heat-set was subjected to a corona discharge treatment.

A coating composition for an image-receiving layer was prepared from the following components.

| Formulation of Image-Receiving Layer: | |
|---|---|
| Water-dispersible glycidyl acrylate-modified polyester (A515G) | 2.00 parts |
| Chain-like colloidal silica (SNOWTEX OUP) | 1.00 part |
| Low-molecular weight polyolefin matting agent (Chemipearl W100) | 0.08 part |
| Phosphoric ester surface active agent (Zerex OM) | 0.30 part |
| Pure water | 100 parts |

The coating composition was coated on the polyethylene terephthalate film by means of a bar coater #4.6 and dried at 185° C. for 10 minutes to form an image-receiving layer having a thickness of 0.15 μm. The same image-receiving layer was also formed on the reverse side of the film in the same manner.

Comparative Example 3

An electrophotographic film was prepared in the same manner as in Example 3, except for replacing the water-dispersible polyester resin with a water-dispersible acrylic resin ("Jurymer AT-613" produced by Nippon Junyaku Co., Ltd.; Tg: 76° C.).

Comparative Example 4

An electrophotographic film was prepared in the same manner as in Example 3, except for replacing the chain-like colloidal silica with spherical colloidal silica ("SNOWTEX C" produced by Nissan Chemicals Industries, Ltd.; average particle diameter: 10 to 20 nm; solid content: 20 to 21%).

Comparative Example 5

An electrophotographic film was prepared in the same manner as in Example 3, except for replacing the low-molecular polyolefin matting agent with a cross-linked PMMA matting agent (MR-2G-20-5).

The films prepared in Example 3 and Comparative Examples 3 to 5 were evaluated according to the following test methods. The results obtained are shown in Table 2 below.

1) Resistance to Embossing:

Photocopies were taken by an electrophotographic copying machine having a commercially available Se drum photoreceptor using a two-component toner, and the unevenness of the film was observed with the naked eye to evaluate resistance to embossing. The greater the unevenness, the greater the reduction in surface smoothness. The results of the observation were rated as follows.

A . . . The film was free from unevenness.

C . . . The film had unevenness, showing reduced surface smoothness.

2) Toner Adhesion (%) and Surface Resistivity (Ω):

Measured in the same manner as in Example 1.

3) Abrasion Resistance:

Evaluated in the same manner as in Example 1. The travel of the load was 20 cm.

4) Surface Resistivity (Ω):

Measured in the same manner as in Example 1.

TABLE 2

| | Example 3 | Compar. Example 3 | Compar. Example 4 | Compar. Example 5 |
|---|---|---|---|---|
| Resistance to Embossing | A | A | A | A |
| Toner Adhesion (%) | 86 | 30 | 53 | 77 |
| Abrasion Resistance | A | C | A | C |
| Surface Resistivity (Ω) | $9 \times 10^{10}$ | $2 \times 10^{12}$ | $6 \times 10^{10}$ | $8 \times 10^{10}$ |

EXAMPLE 4

A 100 μm thick polyethylene terephthalate film having been biaxially stretched and heat-set was subjected to a corona discharge treatment.

A coating composition for a conductive subbing layer was prepared from the following components.

| Formulation of Conductive Subbing Layer: | |
|---|---|
| Water-soluble acrylic resin (Jurymer ET-410; ammonium carboxylate content: 2%) | 1.55 parts |
| Sb-doped tin dioxide (SN-88) | 1.80 parts |
| Sodium sulfonate surface active agent (Sandet BL) | 0.125 part |
| Nonionic surface active agent (EMALEX/NP8.5) | 0.125 part |
| Pure water | 96.4 parts |

The coating composition was coated on the polyethylene terephthalate film by means of a bar coater #2.4 at a coating speed of 105 m/min and dried at 185° C. for 10 minute to form a conductive subbing layer having a thickness of 0.15 μm. The same subbing layer was also formed, on the reverse side of the film. The surface resistivity of the resulting conductive subbing layer was measured by the method hereinafter described.

A coating composition for an image-receiving layer was prepared from the following components.

| Formulation of Image-Receiving Layer: | |
|---|---|
| Water-dispersible glycidyl acrylate-modified polyester (A515G) | 3.00 parts |
| Low-molecular weight polyolefin matting agent (Chemipearl W100) | 0.08 part |
| Nonionic surface active agent (EMALEX/NP8.5) | 0.10 part |
| Pure water | 100 parts |

The coating composition was coated on the polyethylene terephthalate film by means of a bar coater #4.6 and dried at 185° C. for 10 minutes to form an image-receiving layer having a thickness of 0.15 μm. The same image-receiving layer was also formed on the reverse side of the film in the same manner.

Separately, the above coating composition was directly coated on the corona discharge treated 100 μm thick polyethylene terephthalate film by means of a bar coater #4.6 and dried at 185° C. for 10 minutes to form an image-receiving layer. The same image-receiving layer was also formed on the reverse side of the film in the same manner. The thus obtained film sample was measured for surface resistivity described hereinafter.

Comparative Example 6

An electrophotographic film was prepared in the same manner as in Example 4, except for using no low-molecular weight polyolefin matting agent.

Comparative Example 7

An electrophotographic film was prepared in the same manner as in Example 4, except that no conductive subbing layer was formed on the polyethylene terephthalate film and that the image-receiving layer was formed by using the following formulation.

| Formulation of Image-Receiving Layer: | |
|---|---|
| Water-dispersible glycidyl acrylate-modified polyester (A515G) | 3.00 parts |
| Low-molecular weight polyolefin matting agent (Chemipearl W100) | 0.08 part |
| Phosphoric ester surface active agent (Zerex OM) | 0.30 parts |
| Pure water | 100 parts |

The electrophotographic films obtained in Example 4 and Comparative Examples 6 and 7 were evaluated according to the following test methods. The results obtained are shown in Table 3 below.

1) Surface Resistivity (Ω):

Each of samples (a), (b) and (c) described below was charged with electricity, and 1 minute later, surface resistivity was measured with a meter TR-8601. All the measurements were made under conditions of 10° C. and 30% RH, 25° C. and 65% RH, or 30° C. and 85% RH.

Sample (a): A PET film having been subjected to a corona discharge treatment and having provided thereon a conductive subbing layer.

Sample (b): A PET film having been subjected to a corona discharge treatment and having provided thereon an image-receiving layer.

Sample (c): A finally obtained electrophotographic film.

2) Abrasion Resistance:

Abrasion resistance was evaluated in the same manner as in Example 1 at 25° C. and 65% RH. The results were rated as follows.

A . . . No scratch was observed.

B . . . Slight scratches were observed.

C . . . Scratches were observed on the entire surface of the film.

3) Film Feeding Properties and Toner Transfer Properties:

Testing was conducted in the same manner as in Example 1 under varied environmental conditions as shown in Table 3.

4) Toner Adhesion:

Evaluated in the same manner as in Example 1 at 25° C. and 65% RH.

TABLE 3

| | Example 4 | Compar. Example 6 | Compar. Example 7 |
|---|---|---|---|
| Resistivity (Ω): | | | |
| (a) 10° C., 30% RH | $5 \times 10^{10}$ | — | — |
| 25° C., 65% RH | $1 \times 10^{11}$ | — | — |
| 30° C., 85% RH | $5 \times 10^{11}$ | — | — |
| (b) 10° C., 30% RH | $4 \times 10^{16}$ | — | — |
| 25° C., 65% RH | $2 \times 10^{13}$ | — | — |
| 30° C., 85% RH | $5 \times 10^{10}$ | — | — |
| (c) 10° C., 30% RH | $1 \times 10^{11}$ | $1 \times 10^{11}$ | $5 \times 10^{13}$ |
| 25° C., 65% RH | $5 \times 10^{11}$ | $5 \times 10^{11}$ | $1 \times 10^{10}$ |
| 30° C., 85% RH | $5 \times 10^{10}$ | $5 \times 10^{10}$ | $2 \times 10^{8}$ |
| Abrasion Resistance | B | C | A |
| Rate of Double Feeding (%): | | | |
| 10° C., 30% RH | 0 | 20 | 53 |
| 25° C., 65% RH | 0 | 22 | 0 |
| 30° C., 85% RH | 0 | 14 | 0 |
| Toner Transfer Properties: | | | |
| 10° C., 30% RH | 0.85 | 0.87 | 0.84 |
| 25° C., 65% RH | 0.83 | 0.85 | 0.83 |
| 30° C., 85% RH | 0.93 | 0.91 | 0.32 |
| Toner Adhesion (%) | 58 | 57 | 53 |

While the invention has been described in detail and with reference to specific examples thereof, it will be apparent to one skilled in the art that various changes and modifications can be made therein without departing from the spirit and scope thereof.

What is claimed is:

1. An electrophotographic film for receiving toner images, comprising a transparent substrate having formed on at least one side thereof an image-receiving layer containing a binder and at least two kinds of matting agents different in shape, one of the matting agents comprising nearly spherical fine particles, and the other matting agent comprising flat fine particles, with the average short diameter and average long diameter of each of the matting agents satisfying all of relationships (1), (2) and (3):

$$1 \leq L^1/W^1 \leq 1.5 \quad (1)$$

$$L^2/W^2 > 2 \quad (2)$$

$$W^1/W^2 > 1 \quad (3)$$

wherein $L^1$ represents the long diameter of the nearly spherical matting agent; $W^1$ represents the short diameter of the nearly spherical matting agent; $L^2$ represents the long diameter of the flat matting agent; and $W^2$ represents the short diameter of the flat matting agent, said flat matting agent having a coefficient of static friction of not more than 0.4, and said image-receiving layer having a surface resistivity of from $1\times10^9$ to $1\times10^{13}$ Ω as measured at 25° C. and 65% relative humidity.

2. The electrophotographic film as claimed in claim 1, wherein said nearly spherical matting agent has an average particle diameter of from 1 to 10 μm.

3. The electrophotographic film as claimed in claim 1, wherein said flat matting agent has an average particle diameter of from 1 to 5 μm.

4. The electrophotographic film as claimed in claim 1, wherein said flat matting agent has a coefficient of static friction of not more than 0.35.

5. The electrophotographic film as claimed in claim 1, wherein said nearly spherical matting agent has a ring and ball softening point of higher than 140° C.

6. The electrophotographic film as claimed in claim 1, wherein said flat matting agent has a ring and ball softening point of not higher than 140° C.

7. The electrophotographic film as claimed in claim 1, wherein said nearly spherical matting agent has an average long diameter of from 1 to 15 μm, with its average short diameter ranging from 1 to 10 μm.

8. The electrophotographic film as claimed in claim 1, wherein said flat matting agent has an average long diameter of from 1 to 10 μm, with its average short diameter ranging from 1 to 3 μm.

9. An electrophotographic film for receiving toner images, comprising a transparent substrate having formed on at least one side thereof an image-receiving layer, wherein said image-receiving layer contains a polyester resin and chain-shaped colloidal silica having chain lengths of from 10 to 500 nm, and said image-receiving layer has a surface resistivity of from $1\times10^9$ to $1\times10^{13}$ Ω as measured at 25° C. and 65% relative humidity.

10. The electrophotographic film as claimed in claim 9, wherein the polyester resin and chain-shaped colloidal silica are present in a weight ratio of from 1:4 to 4:1.

11. The electrophotographic film as claimed in claim 9, wherein said polyester resin has a glass transition temperature of from 60° to 120° C.

12. The electrophotographic film as claimed in claim 9, wherein said polyester resin contains a glycidyl group in the molecule thereof.

13. The electrophotographic film as claimed in claim 9, wherein said chain-shaped colloidal silica has a thickness of from 5 to 20 nm and chain lengths of from 40 to 300 nm.

14. The electrophotographic film as claimed in claim 9, wherein said image-receiving layer contains a matting agent having an average particle size of from 1 to 5 μm.

15. The electrophotographic film as claimed in claim 9, wherein said image-receiving layer has a thickness of from 0.1 to 1 μm.

16. The electrophotographic film as claimed in claim 9, wherein said transparent substrate comprises polyethylene terephthalate.

17. An electrophotographic film for receiving toner images, comprising a transparent plastic substrate having formed on at least one side thereof a conductive subbing layer and an image-receiving layer formed over said conductive subbing layer, wherein said conductive subbing layer comprises fine particles of a conductive metal oxide having an average particle size of not greater than 0.2 μm and a polymer, and said image-receiving layer contains a polymer and at least two kinds of matting agents different in shape, one of the matting agents comprising nearly spherical fine particles, and the other matting agent comprising flat fine particles, with the average short diameter and average long diameter of each of the matting agents satisfying all of relationships (1), (2) and (3):

$$1 \leq L^1/W^1 \leq 1.5 \quad (1)$$

$$L^2/W^2 > 2 \quad (2)$$

$$W^1/W^2 > 1 \quad (3)$$

wherein $L^1$ represents the long diameter of the nearly spherical matting agent; $W^1$ represents the short diameter of the nearly spherical matting agent; $L^2$ represents the long diameter of the flat matting agent; and $W^2$ represents the short diameter of the flat matting agent, said flat matting agent having a coefficient of static friction of not more than 0.4, said image-receiving layer having a surface resistivity of from $1\times10^{10}$ to $1\times10^{13}$ a as measured at 25° C. and 65% relative humidity.

18. The electrophotographic film as claimed in claim 17, wherein the polymer of said conductive subbing layer and that of said image-receiving layer are both a water-dispersible polymer.

19. The electrophotographic film as claimed in claim 17, wherein said conductive snubbing layer has a surface resistivity of from $1\times10^{10}$ to $1\times10^{13}$ Ω as measured at 25° C. and 65% relative humidity.

20. The electrophotographic film as claimed in claim 17, wherein said flat matting agent comprises a polyolefin.

21. The electrophotographic film as claimed in claim 17, wherein said flat matting agent has a ring and ball softening point of not higher than 140° C.

22. The electrophotographic film as claimed in claim 17, wherein said flat matting agent has an average particle size of from 1 to 10 μm.

23. The electrophotographic film as claimed in claim 17, wherein said metal oxide is an Sb-doped tin dioxide.

* * * * *